(12) United States Patent
Umeyama et al.

(10) Patent No.: US 6,783,274 B2
(45) Date of Patent: Aug. 31, 2004

(54) DEVICE FOR MEASURING TEMPERATURE OF SEMICONDUCTOR INTEGRATED CIRCUIT

(75) Inventors: Takehiko Umeyama, Tokyo (JP); Kazuyuki Ohmi, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/391,592

(22) Filed: Mar. 20, 2003

(65) Prior Publication Data

US 2004/0081224 A1 Apr. 29, 2004

(30) Foreign Application Priority Data

Oct. 24, 2002 (JP) ........................................ 2002-309490

(51) Int. Cl.[7] .............................. G01K 7/01; H01L 35/00
(52) U.S. Cl. ....................... 374/178; 374/183; 327/512; 327/513; 702/130
(58) Field of Search ................................ 374/178, 163, 374/181, 182, 183; 327/512, 513; 702/130–136

(56) References Cited

U.S. PATENT DOCUMENTS

| | | | | |
|---|---|---|---|---|
| 4,224,537 A | * | 9/1980 | Glazer .......................... | 327/512 |
| 4,277,975 A | * | 7/1981 | Pinkham ...................... | 374/170 |
| 4,549,818 A | * | 10/1985 | Nishikubo et al. ........... | 374/178 |
| 5,149,199 A | * | 9/1992 | Kinoshita et al. ............ | 374/178 |
| 5,359,236 A | * | 10/1994 | Giordano et al. ............ | 327/512 |
| 5,873,053 A | * | 2/1999 | Pricer et al. .................. | 702/130 |
| 5,914,629 A | * | 6/1999 | Maki ............................ | 327/512 |
| 5,961,215 A | * | 10/1999 | Lee et al. ..................... | 374/178 |
| 6,271,710 B1 | * | 8/2001 | Ooishi ........................... | 327/512 |
| 6,310,510 B1 | * | 10/2001 | Goldman et al. ............ | 327/538 |
| 6,313,692 B1 | * | 11/2001 | Pease ........................... | 327/538 |
| 6,342,781 B1 | * | 1/2002 | Laraia .......................... | 323/313 |
| 6,628,558 B2 | * | 9/2003 | Fiscus .......................... | 365/222 |
| 6,677,800 B1 | * | 1/2004 | Pai ............................... | 327/512 |
| 6,683,490 B2 | * | 1/2004 | Kaminishi ................... | 327/538 |

FOREIGN PATENT DOCUMENTS

JP    2000-241252    9/2000

* cited by examiner

*Primary Examiner*—Gail Verbitsky
(74) *Attorney, Agent, or Firm*—Leydig, Voit & Mayer, Ltd.

(57) ABSTRACT

A device for measuring temperature of a semiconductor integrated circuit includes first and second current mirror circuits, an N channel transistor connected to an output terminal of the second cur rent mirror circuit, an npn transistor connected to an output terminal of the first current mirror circuit and the N channel transistor, and an operational transistor connected to a node between the second current circuit and the N channel transistor. Currents that flow from the second current mirror circuit to the N channel transistor and from the N channel transistor to the npn transistor have different temperature coefficients. The operational amplifier corrects the difference in the temperature coefficients of these currents to output a voltage of ground electric potential standard.

8 Claims, 4 Drawing Sheets

DEVICE FOR MEASURING TEMPERATURE OF SEMICONDUCTOR INTEGRATED CIRCUIT

BACKGROUND OF THE INVENTION

1. Field of the Invention

The present invention relates to a device for measuring temperature of a semiconductor integrated circuit (hereafter "semiconductor temperature measuring circuit") that measures the temperature within a semiconductor integrated circuit.

2. Description of the Related Art

The temperature within a semiconductor integrated circuit can, depending on the power consumed, rise to a high temperature of about 140° from the environment temperature (27° C.). Such high temperatures can alter the electrical characteristics, cause damage to the circuitry and reduce the service life of the semiconductor integrated circuit. Therefore, conventionally a semiconductor integrated circuit is provided with a temperature measuring circuit to monitor the change of temperature within the semiconductor integrated circuit.

Such a temperature measuring circuit includes two npn transistors, as a temperature measuring element, connected in series to a diode. These npn transistors are placed between a current generator provided on a power source side and the ground. The temperature measuring circuit outputs a voltage corresponding to the temperature within the semiconductor integrated device from the collector terminals of the npn transistors.

However, in this temperature measuring circuit, the voltage output depends greatly on the temperature characteristics of the npn transistors. This makes the setting of the temperature at 0V output to any preferred value or setting of a temperature in order to obtain a desired temperature voltage characteristics difficult.

Further, as the temperature characteristics of the npn transistors are altered in order to measure the temperature, it is difficult to change the temperature voltage characteristics gradient to any desired value, moreover, it exerts a bad effect on electric characteristics of other circuit elements in the semiconductor integrated device.

SUMMARY OF THE INVENTION

It is an objective of the present invention to solve the problems in the conventional technology.

The semiconductor temperature measuring circuit according to one aspect of the present invention comprises a first current mirror circuit and a second current mirror circuit both connected to a positive power source, each of the first current mirror circuit and the second mirror circuit having a control electrode, the control electrodes of the first current mirror circuit and the second mirror circuit are commonly connected, the second current mirror circuit having a first output terminal and a second output terminal; a third current mirror circuit provided between an output terminal of the first current mirror circuit and the ground, the third current mirror circuit being made of a first npn transistor having a first emitter size and a second npn transistor having a second emitter size, the first emitter size being greater than the second emitter size, an emitter electrode of the first npn transistor is connected to the ground via a first resistor, and an emitter electrode of the second npn transistor is directly connected to the ground; a third npn transistor having a collector electrode connected to the first output terminal of the second current mirror circuit and an emitter electrode connected to the negative power source, and a base electrode connected to the negative power source via a second resistor; an N channel transistor having a control electrode, a first signal electrode, and a second signal electrode, wherein the control electrode is connected to the first output terminal of the second current mirror circuit, the first signal electrode is connected to the second output terminal of the second current mirror circuit, and the second signal electrode is connected to the base electrode of the third npn transistor; and an operational amplifier that has a negative gradient with respect to temperature, the operational amplifier having a negative input terminal and a positive input terminal, the negative input terminal is connected to a node between the second output terminal of the second current mirror circuit and the first signal electrode of the N channel transistor, as well as to an output terminal via a resistor unit, and the positive input phase terminal is directly connected to the ground.

The semiconductor temperature measuring circuit according to another aspect of the present invention comprises the first current mirror circuit and the second current mirror circuit; the third current mirror circuit; the third npn transistor; and the N-channel transistor described above. In addition the semiconductor temperature measuring circuit has an operational amplifier that has a positive gradient with respect to temperature, the operational amplifier having a positive input terminal and a negative input terminal, the positive input terminal is connected to a node between the second output terminal of the second current mirror circuit and the first signal electrode of the N channel transistor, as well as to the ground via a resistor unit, and the negative input phase terminal is directly connected to the output terminal.

These and other objects, features and advantages of the present invention are specifically set forth in or will become apparent from the following detailed descriptions of the invention when read in conjunction with the accompanying drawings.

DETAILED DESCRIPTION

Exemplary embodiments of the semiconductor temperature measuring circuit according to the present invention are explained next, with reference to the accompanying drawings.

Figure 1:
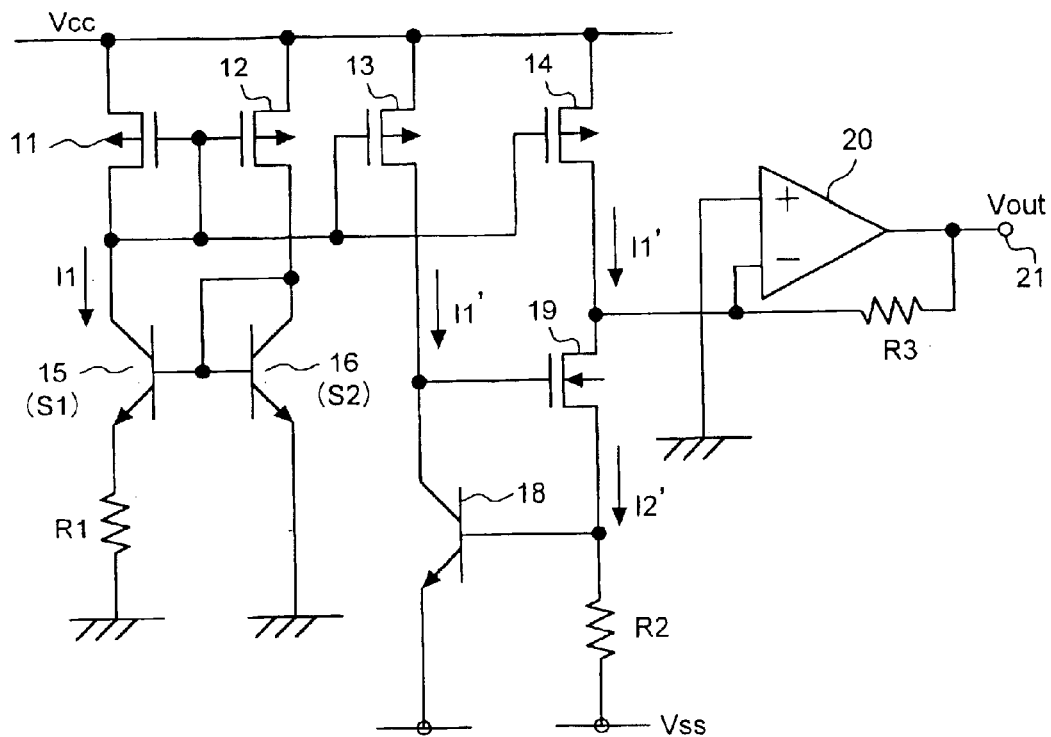
FIG. 1 shows the structure of a first embodiment of a semiconductor temperature measuring circuit according to the present invention.

FIG. 1 is a drawing of a semiconductor temperature measuring circuit according to the first embodiment of the present invention. Source electrodes of four P channel transistors 11, 12, 13 and 14 that form a current mirror circuit are connected to a positive power source Vcc. The gate electrodes of the P channel transistors 11, 12, 13 and 14 are commonly connected to a drain electrode of the P channel transistor 11.

The drain electrode of P channel transistor 11 is connected to the collector electrode of an npn transistor 15. An emitter electrode of the npn transistor 15 is connected to the ground via a resistor R1. A base electrode of the npn transistor 15 is connected to a collector electrode of an npn transistor 16 and a base electrode as well as a drain electrode of the P channel transistor 12.

An emitter electrode of the npn transistor 16 is directly connected to the ground. The npn transistors 15 and 16 form a current mirror circuit. An emitter size S1 of the npn transistor 15 is much larger than an emitter size S2 of the npn transistor 16.

A drain electrode of the P channel transistor 13 is connected to a collector electrode of an npn transistor 18 and a gate electrode of an N channel transistor 19. A drain electrode of the P channel transistor 14 is connected to a drain electrode of the N channel transistor 19. An emitter electrode of the npn transistor 18 is directly connected to a negative power source. A base electrode of the npn transistor 18 and a source electrode of the N channel transistor 19 are commonly connected to the negative power source via a resistor R2.

The drain electrode of the P channel transistor 14 and the drain electrode of the N channel transistor 19 are connected to a negative input terminal of an operational amplifier 20. A positive (+) input terminal of the operational amplifier 20 is directly connected to the ground. An output terminal of the operational amplifier 20 is connected to an output terminal 21 of the semiconductor temperature measuring circuit.

Assuming that the emitter size S1 of the npn transistor 15 is 5 times larger than the emitter size S2 of the npn transistor 16, the resistance of resistor R1 is R1, T is the absolute temperature [T], k is the Boltzmann constant which is equal to $1.38 \times 10^{-23}$ [J/K], and q is a unit electric charge, then a current I1 output from the drain electrode of the P channel transistor 11 to the collector electrode of the npn transistor 15 can be calculated by the following expression.

$$I1 = (1/R1) \cdot (kT/q) \ln(S1/S2) \qquad (1)$$

Further, due to the characteristics of the current mirror circuit, a current I1' output from the drain electrodes of the P channel transistors 13 and 14 is equal to I1.

A current I2' output from the source electrode of the N channel transistor 19 does not depend on the voltage of the negative (−) input terminal of the operational amplifier but is determined by the voltage Vbe between the base electrode and the emitter electrode of the npn transistor 18, and the resistance R2 of the resistor R2. Therefore the expression for calculating the current I2' is as follows.

$$I2' = Vbe/R2 \qquad (2)$$

Consequently the voltage Vout can be calculated using the following expression.

$$\begin{aligned} Vout &= R3 \, (I2' - I1') \qquad (3) \\ &= R3 \, \{(Vbe/R2) - ((1/R1) \cdot (kT/q) \ln(S1/S2))\} \end{aligned}$$

In the semiconductor temperature measuring circuit shown in FIG. 1, there arises a differential current (I2'−I1') based on the current I1', which is proportional to (kT/q·R1), and the current I2', which is proportional to (Vbe/R2). The two currents I1' and I2' have different temperature coefficients. The operational amplifier 20 corrects the differential current such that the difference in the temperature coefficients is compensated and converts the two currents to a voltage of ground electric potential standards. As the temperature coefficient δVbe/δT of the voltage Vbe between the base electrode and the emitter electrode of the npn transistor 18 is negative (about −2 mV/° C.), the voltage Vout output from the output terminal 21 is in the form of voltage signals that have a negative gradient with respect to the temperature.

Figure 2:
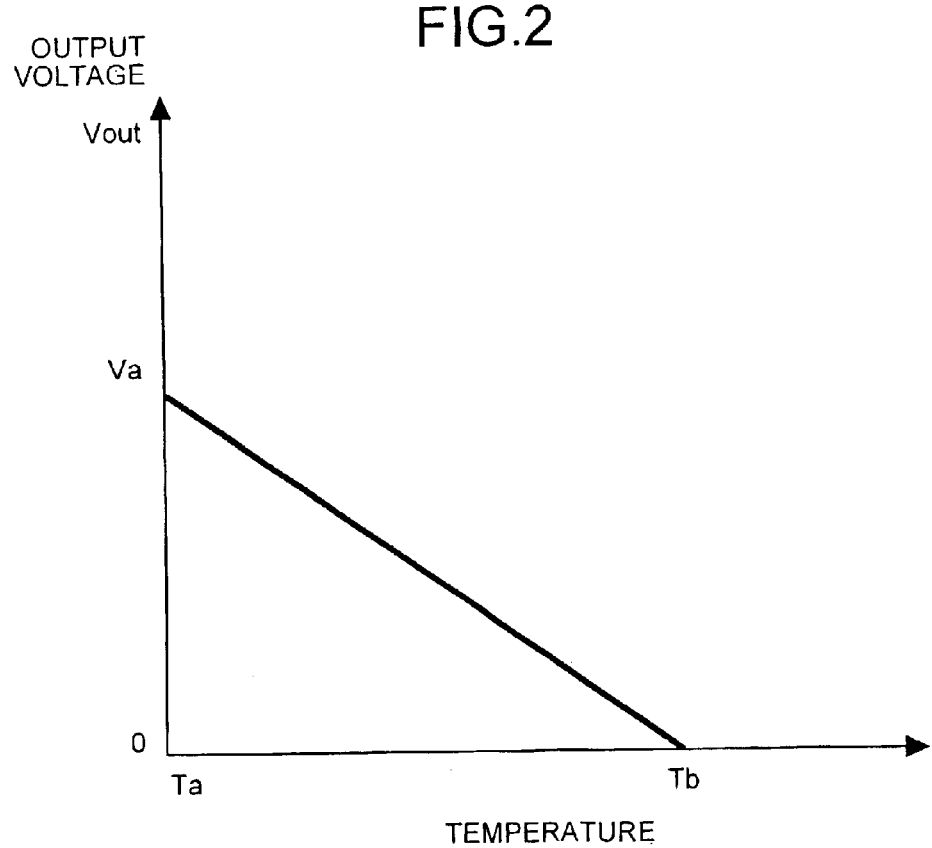
FIG. 2 is a temperature voltage characteristics graph displaying a negative gradient obtained using the semiconductor temperature measuring circuit shown in FIG. 1.

FIG. 2 is a graph showing a negative gradient temperature voltage characteristic obtained using the semiconductor temperature measuring circuit shown in FIG. 1. The temperature Tb in FIG. 2 is a temperature at which the output voltage Vout is 0V. From this point the graph has a negative gradient because the output voltage falls from Va to 0V as the temperature rises from Ta to Tb. Therefore the gradient of the temperature voltage characteristic shown in FIG. 2 is −Va/(Tb−Ta).

The resistances R1, R2 and R3, which are parameters to be set when Vout=0V is to be achieved at temperature Tb, can be determined by the following expressions. If the current Iref is the current when Vout=0V is obtained at temperature Tb, then from the expressions (1) and (2), $$R1 = (1/Iref) \cdot (kTb/q) \ln(S1/S2) \qquad (4)$$

$$R2 = Vbe \cdot Tb/Iref \qquad (5)$$

If the temperature voltage characteristics gradient −Va/(Tb−Ta) in FIG. 2 and the gradient obtained by using expression (3) are taken to be equal, then $$R3 = [-Va/Tb-Ta]/[(1/R2)(\delta Vbe/\delta T) - ((1/R1) \cdot (k/q) \ln(S1/S2))] \qquad (6)$$

At the point when I1'=I2', the output voltage Vout=0V. Therefore the above calculation is equivalent to setting the resistances R1 and R2 such that I1'=I2' at any set temperature Tb. Consequently, any temperature can be output as Vout=0V and any preferred negative gradient temperature voltage characteristics can be obtained. The temperature voltage characteristics can be further adjusted by changing the resistance R3.

Therefore according to the first embodiment of the present invention, 0V can be output at any desired temperature, and any desired negative gradient temperature voltage characteristics can be obtained. Therefore a voltage output that has a wide range correlation can be obtained. Consequently, the temperature of the semiconductor integrated can be measured with high accuracy.

Figure 3:
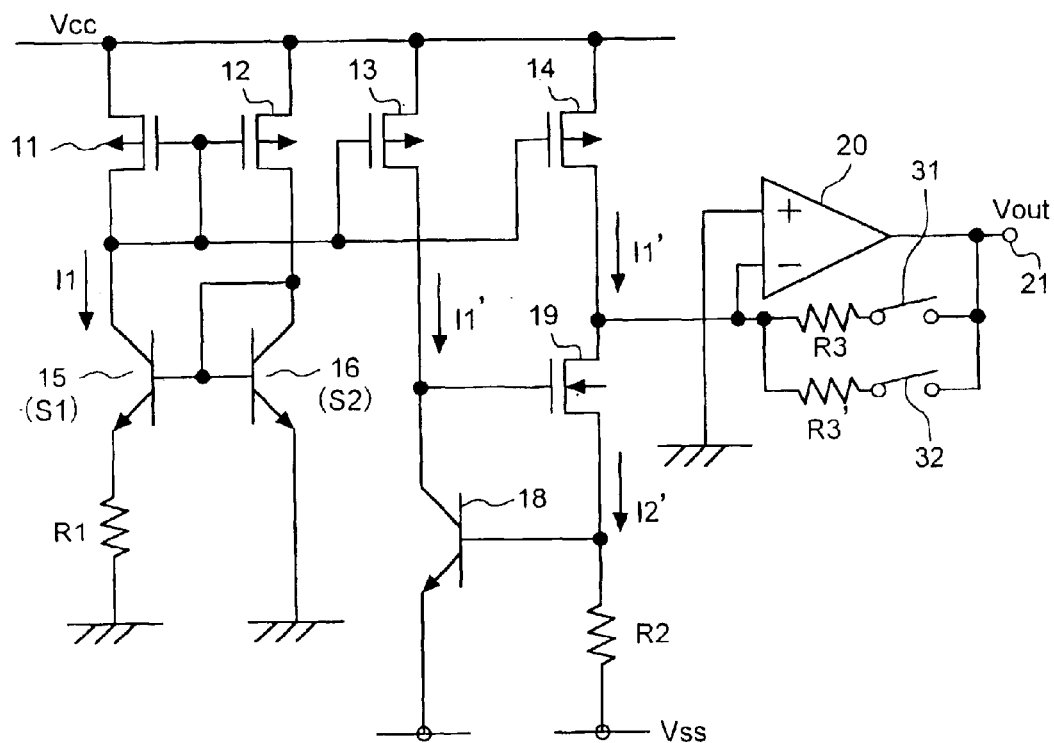
FIG. 3 shows the structure of a second embodiment of a semiconductor temperature measuring circuit according to the present invention.

FIG. 3 is a drawing of a semiconductor temperature measuring circuit according to the second embodiment of the present invention. The components that are identical to those in FIG. 1 are assigned the same reference numerals. The components that are peculiar to the second embodiment are explained next.

In the second embodiment, the negative feedback circuit, which includes the operational amplifier 20 and the resistor R3 as shown in FIG. 1, includes a plurality of series-connected resistors and switches, connected in parallel. In FIG. 3, the resistor R3 and switch 31 connected in series, and resistor R3' and switch 32). The resistors R3 and R3' have different resistances. The switch 31 and 32 may, for instance, be made of MOS transistors.

Figure 4:
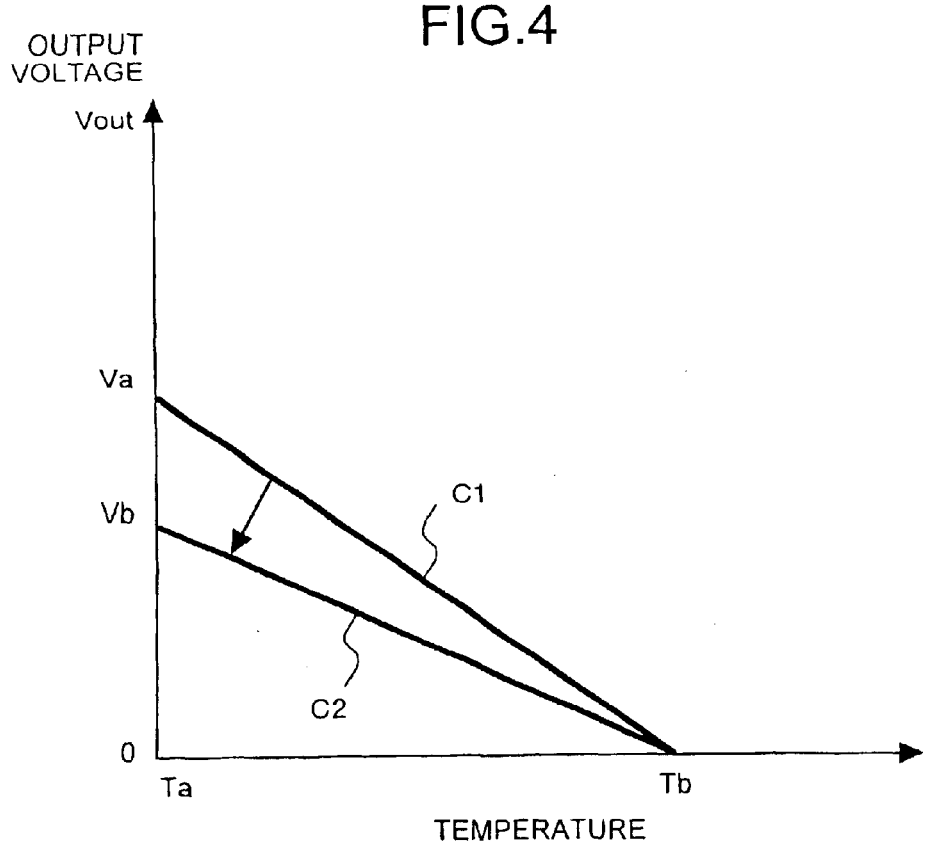
FIG. 4 is a temperature voltage characteristics graph displaying a plurality of negative gradients obtained using the semiconductor temperature measuring circuit shown in FIG. 3.

FIG. 4 is a graph showing multiple negative gradient temperature voltage characteristics obtained using the semiconductor temperature measuring circuit shown in FIG. 3. The temperature voltage characteristic curve C1 in FIG. 4 is obtained when the switch 31 is closed and the switch 32 is open. The temperature voltage characteristic curve C1 shows that at the temperature Tb, the output voltage Vout is 0V. From this point the graph has a negative gradient because the output voltage falls from Va to 0V as the temperature rises from Ta to Tb.

The temperature voltage characteristic curve C2 is obtained when the switch 31 is open and the switch 32 is closed. The temperature voltage characteristic curve C2 also has a negative gradient because the output voltage falls from Vb to 0V as the temperature rises from Ta to Tb. As can be seen from FIG. 4, voltage Vb is less than voltage Va, thus producing a temperature voltage characteristic gradient that is gentler than that of the temperature voltage characteristic C1.

Thus, according to the second embodiment of the present invention, by multi-step switching of the resistance that is introduced into the negative feedback circuit of the operational amplifier by manipulating the switches, a plurality of temperature voltage characteristics having different gradients are obtained based on the set temperature. Thus, a semiconductor temperature measuring circuit that can measure the temperature of the semiconductor integrated circuit more precisely than the semiconductor temperature measuring circuit according to the first embodiment is obtained.

Figure 5:
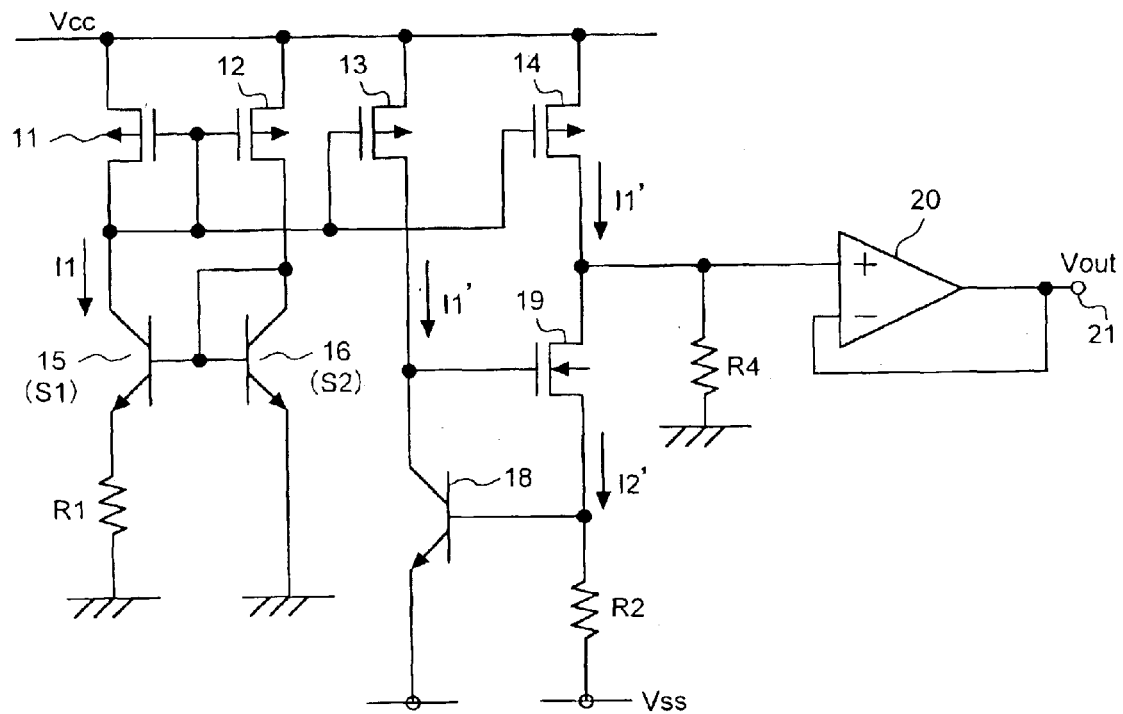
FIG. 5 shows the structure of a third embodiment of a semiconductor temperature measuring circuit according to the present invention.

FIG. 5 is a drawing of a semiconductor temperature measuring circuit according to the third embodiment of the present invention. This circuit is configured to obtain a temperature voltage characteristic having a positive gradient. The components that are identical to those in FIG. 1 are assigned the same reference numerals. The components that are peculiar to the second embodiment are explained next.

In the third embodiment of the present invention, a node between the drain electrodes of the P channel transistor 14 and the N channel transistor 19 shown in FIG. 1 is connected to the positive input terminal of the operational amplifier 20. The negative input terminal of the operational amplifier 20 is directly connected to the output terminal 21. A resistor R4 is connected between the positive input terminal and the ground.

In the structure described above, the current I1' (=I1) output from the drain electrode of the P channel transistor 14, and the current I2' output from the source electrode of the N channel transistor 19 can be, similar to the first embodiment, calculated by the following expressions.

$$I1'=(1/R1)\cdot(kT/q)\ln(S1/S2) \propto kT/q \quad (7)$$

$$I2'=Vbe/R2 \quad (8)$$

The resistances of the resistors R1 and R2 are set in such a way that at the temperature Tb, I1'=I2'=Iref. The current flowing through the resistor R4 will be zero and the voltage at the output terminal 21 will be 0v.

The current flowing through the resistor R4 changes with a change in the temperature. Therefore the voltage Vout can be calculated by the following expression.

$$Vout=R4(I1'-I2')=R4[(1/R1)\cdot(kT/q)\ln(S1/S2)]-(Vbe/R2)] \quad (9)$$

Figure 6:
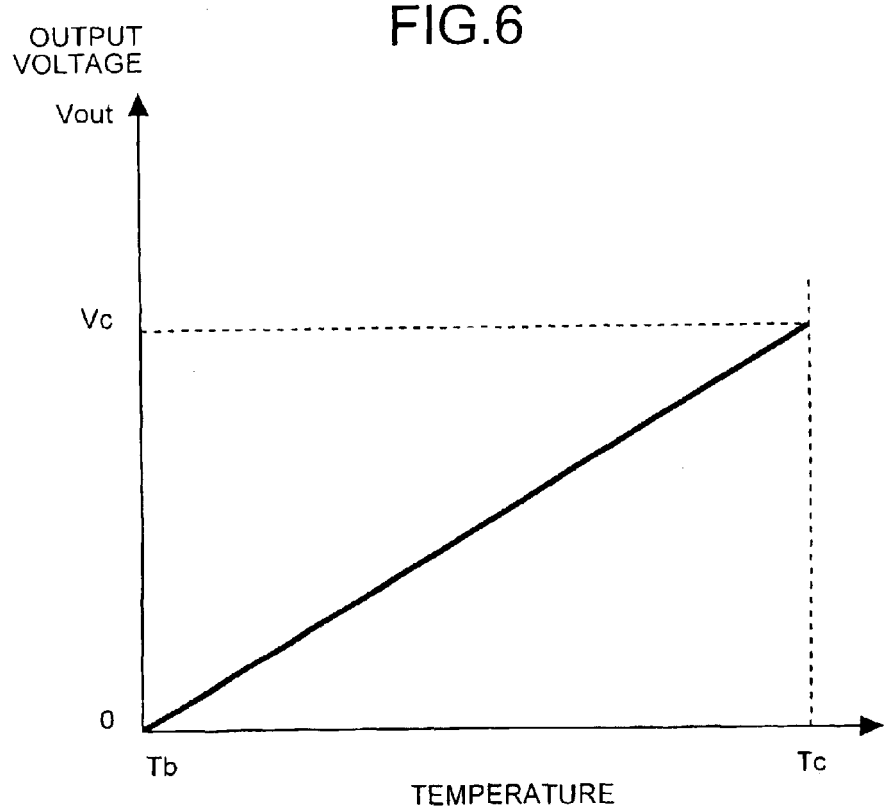
FIG. 6 is a temperature voltage characteristics graph displaying a positive gradient obtained using the semiconductor temperature measuring circuit shown in FIG. 5.

As a result, as shown in FIG. 6, a voltage Vout that has a positive gradient with respect to the temperature is output.

FIG. 6 is a graph that shows a positive gradient temperature voltage characteristic obtained using the semiconductor temperature measuring circuit shown in FIG. 5. The voltage Vout at the temperature Tb is 0V. From this point the graph has a positive gradient because the output voltage rises from 0V to Vc as the temperature rises from Tb to Tc.

Therefore according to the third embodiment of the present invention, voltage 0V can be output at any desired temperature, and any desired positive gradient temperature voltage characteristics can be obtained. Therefore a voltage output that has a wide range correlation can be obtained. Consequently high-accuracy temperature measurement can be achieved.

Figure 7:
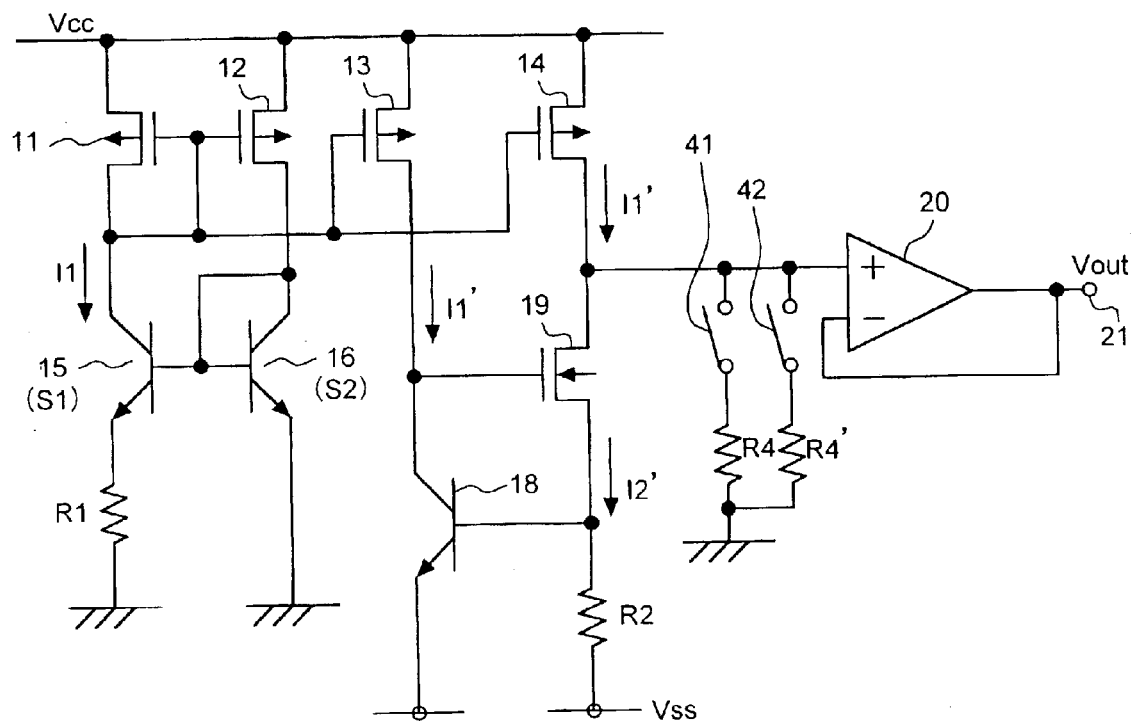
FIG. 7 shows the structure of a fourth embodiment of a semiconductor temperature measuring circuit according to the present invention.

FIG. 7 is a drawing of a semiconductor temperature measuring circuit according to the fourth embodiment of the present invention. The components that are identical to those in FIG. 5 are assigned the same reference numerals. The components that are peculiar to the second embodiment are explained next.

In the fourth embodiment, a plurality of circuits connected in parallel, each circuit having a resistor and a switch connected in series, are provided between the positive input terminal of the operational amplification and the ground. In FIG. 7, a resistor R4 and a switch 41 form one serially connected circuit, and a resistor R4' and a switch 42 form another serially connected circuit. The resistors R4 and R4' have different resistances. The switches 41 and 42 may, for instance, be made of MOS transistors.

Figure 8:
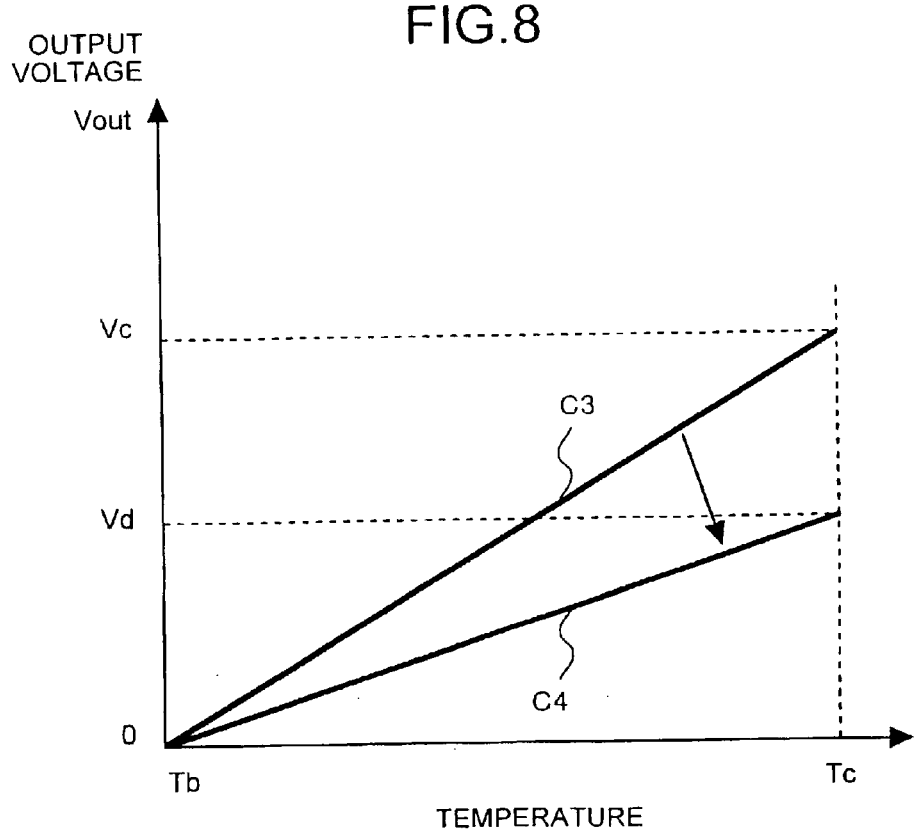
FIG. 8 is a temperature voltage characteristics graph displaying a plurality of positive gradients obtained using the semiconductor temperature measuring circuit shown in FIG. 7.

FIG. 8 is a graph showing multiple positive gradient temperature voltage characteristics obtained using the semiconductor temperature measuring circuit shown in FIG. 7. The temperature voltage characteristic curve C3 in FIG. 8 is obtained when the switch 41 is closed and the switch 42 is open. Similar to the temperature voltage characteristic curve C1, the temperature voltage characteristic curve C3 shows that at the temperature Tb, the voltage Vout is 0V. From this point the graph has a positive gradient because the output voltage rises from 0V to Vc as the temperature rises from Tb to Tc.

The temperature voltage characteristic curve C4 is obtained when the switch 41 is open and the switch 42 is closed. The temperature voltage characteristic curve C4 indicates that at the temperature Tb, the output voltage Vout is 0V. The voltage output rises to Vd at the specified temperature Tc, which is higher than Tb. As can be seen from FIG. 8, Vd is less than Vc, thus producing a temperature voltage characteristic gradient that is gentler than that of the temperature voltage characteristic curve C3.

Thus, according to the fourth embodiment of the present invention, by multi-step switching of the resistance that is introduced between the positive input terminal and the ground by manipulating the switches, a plurality of temperature voltage characteristics having different gradients are obtained based on the set temperature. Thus, a semiconductor temperature measuring circuit that can measure the temperature of the semiconductor integrated device more precisely than the semiconductor temperature measuring circuit according to the third embodiment is obtained.

Even if the p-channel transistors 11, 12, 13 and 14, and the n-channel transistor 19 in FIG. 1, FIG. 3, FIG. 5, and FIG. 7 are replaced by bipolar transistors, it will produce the same effects.

According to the present invention, voltage 0V can be output at any desired temperature, and any desired gradient temperature voltage characteristics can be obtained.

Therefore, a voltage output that has a wide range correlation can be obtained. Consequently, the temperature of the semiconductor integrated can be measured with high accuracy.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A semiconductor temperature measuring circuit, comprising:

a first current mirror circuit and a second current mirror circuit, both connected to a positive power source, each of the first current mirror circuit and the second current mirror circuit having a control electrode, the control electrodes of the first current mirror circuit and the second current mirror circuit being commonly connected, and the second current mirror circuit having a first output terminal and a second output terminal;

a third current mirror circuit provided between an output terminal of the first current mirror circuit and the ground, the third current mirror circuit including a first npn transistor having a first emitter size and a second npn transistor having a second emitter size, the first emitter size being larger than the second emitter size, an emitter electrode of the first npn transistor being connected to the ground via a first resistor, and an emitter electrode of the second npn transistor being directly connected to the ground;

a third npn transistor having a collector electrode connected to the first output terminal of the second current mirror circuit and an emitter electrode connected to a negative power source, and a base electrode connected to the negative power source via a second resistor;

an N channel transistor having a control electrode, a first signal electrode, and a second signal electrode, wherein the control electrode is connected to the first output terminal of the second current mirror circuit, the first signal electrode is connected to the second output terminal of the second current mirror circuit, and the second signal electrode is connected to the base electrode of the third npn transistor; and an operational amplifier that has a negative gradient with respect to temperature, the operational amplifier having a negative input terminal and a positive input terminal, the negative input terminal being connected to a node that is connected to the second output terminal of the second current mirror circuit and the first signal electrode of the N channel transistor, and to an output terminal of the operational amplifier via a resistor unit, and the positive input phase terminal being directly connected to the ground.

2. The semiconductor temperature measuring circuit according to claim 1, wherein the resistor unit includes a resistor.

3. The semiconductor temperature measuring circuit according to claim 1, wherein the resistor unit includes a plurality of resistor-switch circuits connected in parallel, each resistor-switch circuit having a resistor and a switch connected in series, and the resistors in each of the resistor-switch circuits having different resistances from each other.

4. The semiconductor temperature measuring circuit according to claim 1, wherein the resistances of the first resistor and the second resistor are set such that voltage output from the operational amplifier is 0V at any temperature at which current that flows in the node that is connected to the second output terminal of the second current mirror circuit and the first signal electrode of the N channel transistor, and current that is output from the N channel transistor to a node connected to the base electrode of the third npn transistor and the second resistor, are equal.

5. A semiconductor temperature measuring circuit, comprising:

a first current mirror circuit and a second current mirror circuit, both connected to a positive power source, each of the first current mirror circuit and the second current mirror circuit having a control electrode, the control electrodes of the first current mirror circuit and the second current mirror circuit being commonly connected, and the second current mirror circuit having a first output terminal and a second output terminal;

a third current mirror circuit provided between an output terminal of the first current mirror circuit and the ground, the third current mirror circuit including a first npn transistor having a first emitter size and a second npn transistor having a second emitter size, the first emitter size being larger than the second emitter size, an emitter electrode of the first npn transistor being connected to the ground via a first resistor, and an emitter electrode of the second npn transistor being directly connected to the ground;

a third npn transistor having a collector electrode connected to the first output terminal of the second current mirror circuit and an emitter electrode connected to a negative power source, and a base electrode connected to the negative power source via a second resistor;

an N-channel transistor having a control electrode a first signal electrode, and a second signal electrode, wherein the control electrode is connected to the first output terminal of the second current mirror circuit, the first signal electrode is connected to the second output terminal of the second current mirror circuit, and the second signal electrode is connected to the base electrode of the first npn transistor; and an operational amplifier that has a positive gradient with respect to temperature, the operational amplifier having a positive input terminal and a negative input terminal, the positive input terminal being connected to a node that is connected to the second output terminal of the second current mirror circuit and the first signal electrode of the N channel transistor, and to the ground via a resistor unit, and the negative input phase terminal being directly connected to an output terminal of the operational amplifier.

6. The semiconductor temperature measuring circuit according to claim 5, wherein the resistor unit includes a resistor.

7. The semiconductor temperature measuring circuit according to claim 5, wherein the resistor unit includes a plurality of resistor-switch circuits connected in parallel, each resistor-switch circuit having a resistor and a switch connected in series, and the resistors in each of the resistor-switch circuits having different resistances from each other.

8. The semiconductor temperature measuring circuit according to claim 5, wherein the resistances of the first resistor and the second resistor are set such that voltage output from the operational amplifier is 0V at any temperature at which current that flows in the node that is connected to the second output terminal of the second current mirror circuit and the first signal electrode of the N channel transistor, and current that is output from the N channel transistor to a node connected to the base electrode of the third npn transistor and the second resistor, are equal.

* * * * *